United States Patent
Whitens et al.

(10) Patent No.: US 10,183,546 B2
(45) Date of Patent: Jan. 22, 2019

(54) INFRARED SENSOR ARRAYS FOR MONITORING VEHICLE OCCUPANTS AND WINDOWS

(71) Applicant: Ford Global Technologies, LLC, Dearborn, MI (US)

(72) Inventors: Mike James Whitens, Novi, MI (US); Clay Wesley Maranville, Ypsilanti, MI (US); Cynthia Mowery Flanigan, Canton, MI (US); Victoria Leigh Schein, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/443,940

(22) Filed: Feb. 27, 2017

(65) Prior Publication Data
US 2018/0244129 A1    Aug. 30, 2018

(51) Int. Cl.
| | | |
|---|---|---|
| *B60H 1/00* | (2006.01) | |
| *G01J 5/00* | (2006.01) | |
| *G01J 5/10* | (2006.01) | |
| *B60S 1/02* | (2006.01) | |

(52) U.S. Cl.
CPC ..... *B60H 1/00742* (2013.01); *B60H 1/00878* (2013.01); *B60S 1/023* (2013.01); *G01J 5/0025* (2013.01); *G01J 5/0037* (2013.01); *G01J 5/10* (2013.01); *G01J 2005/106* (2013.01)

(58) Field of Classification Search
CPC .. B60H 1/00742; B60H 1/00878; B60H 1/00; B60H 1/00842; B60H 2001/00185; B60H 1/00007; B60H 1/00035; B60H 1/00064; B60S 1/023; G01J 5/0025; G01J 5/0037;
(Continued)

(56) References Cited

U.S. PATENT DOCUMENTS

| | | | |
|---|---|---|---|
| 7,188,668 B2 * | 3/2007 | Hara | B60H 1/00742 165/202 |
| 7,946,505 B2 * | 5/2011 | Lynam | B60H 1/00785 236/44 C |
| 9,504,386 B2 * | 11/2016 | Kozloski | A61B 5/00 |

(Continued)

FOREIGN PATENT DOCUMENTS

| | | |
|---|---|---|
| KR | 20070030552 A | 3/2007 |
| KR | 20100082877 A | 7/2010 |
| KR | 101159998 B1 | 6/2012 |

OTHER PUBLICATIONS

Search Report dated Jul. 31, 2018 for GB Patent Application No. GB 1802948.8 (3 Pages).

*Primary Examiner* — Justin Jonaitis
(74) *Attorney, Agent, or Firm* — James P. Muraff; Neal, Gerber & Eisenberg LLP

(57) ABSTRACT

Method and apparatus are disclosed for infrared sensor arrays for monitoring vehicle occupants and windows. An example vehicle includes a side window and an infrared sensor array. The infrared sensor array includes first pixels of measurement resolution to monitor an occupant and second pixels of measurement resolution to monitor the side window. The example vehicle also includes a cabin environment controller to detect, via the first pixels, whether a body temperature of the occupant is outside a predetermined temperature range and detect, via the second pixels, whether fog is on the side window.

18 Claims, 6 Drawing Sheets

(58) Field of Classification Search
CPC .. G01J 5/10; G01J 2005/106; G06K 9/00838; B61D 27/00
USPC .......................... 165/237, 202, 204, 41, 42
See application file for complete search history.

(56) References Cited

U.S. PATENT DOCUMENTS

| | | | |
|---|---|---|---|
| 9,643,471 B2* | 5/2017 | Prakah-Asante | ............................ B60H 1/00742 |
| 2003/0211820 A1* | 11/2003 | Tsuji | .................. B60H 1/00785 454/93 |
| 2004/0215382 A1* | 10/2004 | Breed | ...................... B60C 11/24 701/45 |
| 2006/0207325 A1* | 9/2006 | Kataoka | ............. G01N 21/4738 73/335.01 |
| 2007/0114292 A1 | 5/2007 | Breed et al. | |
| 2007/0235549 A1 | 10/2007 | Nkajima | |
| 2007/0243808 A1* | 10/2007 | Mathur | .............. B60H 1/00764 454/75 |
| 2008/0036580 A1* | 2/2008 | Breed | ............... B60R 21/01536 340/438 |
| 2016/0082808 A1 | 3/2016 | Perkins | |

* cited by examiner

INFRARED SENSOR ARRAYS FOR MONITORING VEHICLE OCCUPANTS AND WINDOWS

TECHNICAL FIELD

The present disclosure generally relates to infrared sensors and, more specifically, to infrared sensor arrays for monitoring vehicle occupants and windows.

BACKGROUND

Generally, a vehicle includes a windshield, a rear window, and side windows that partially define a cabin of the vehicle and enable a driver and/or other occupant(s) (e.g., passengers) to view an area surrounding the vehicle. Oftentimes, the windshield is formed from laminated safety glass, and the side and rear windows are formed from tempered and/or laminated glass. In some instances in which a glass temperature is at or below a dew point temperature, a film of fog forms on the windshield, the side windows, and/or the rear window.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for infrared sensor arrays for monitoring vehicle occupants and windows. An example disclosed vehicle includes a side window and an infrared sensor array. The infrared sensor array includes first pixels of measurement resolution to monitor an occupant and second pixels of measurement resolution to monitor the side window. The example disclosed vehicle also includes a cabin environment controller to detect, via the first pixels, whether a body temperature of the occupant is outside a predetermined temperature range and detect, via the second pixels, whether fog is on the side window.

An example disclosed method for monitoring vehicle occupants and windows includes monitoring a body temperature of an occupant via first pixels of measurement resolution of an infrared sensor array, monitoring a side window via second pixels of measurement resolution of the infrared sensor array, and, adjusting, via a processor, an HVAC setting in response to detecting at least one of the body temperature being outside a predetermined temperature range and fog on the side window.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
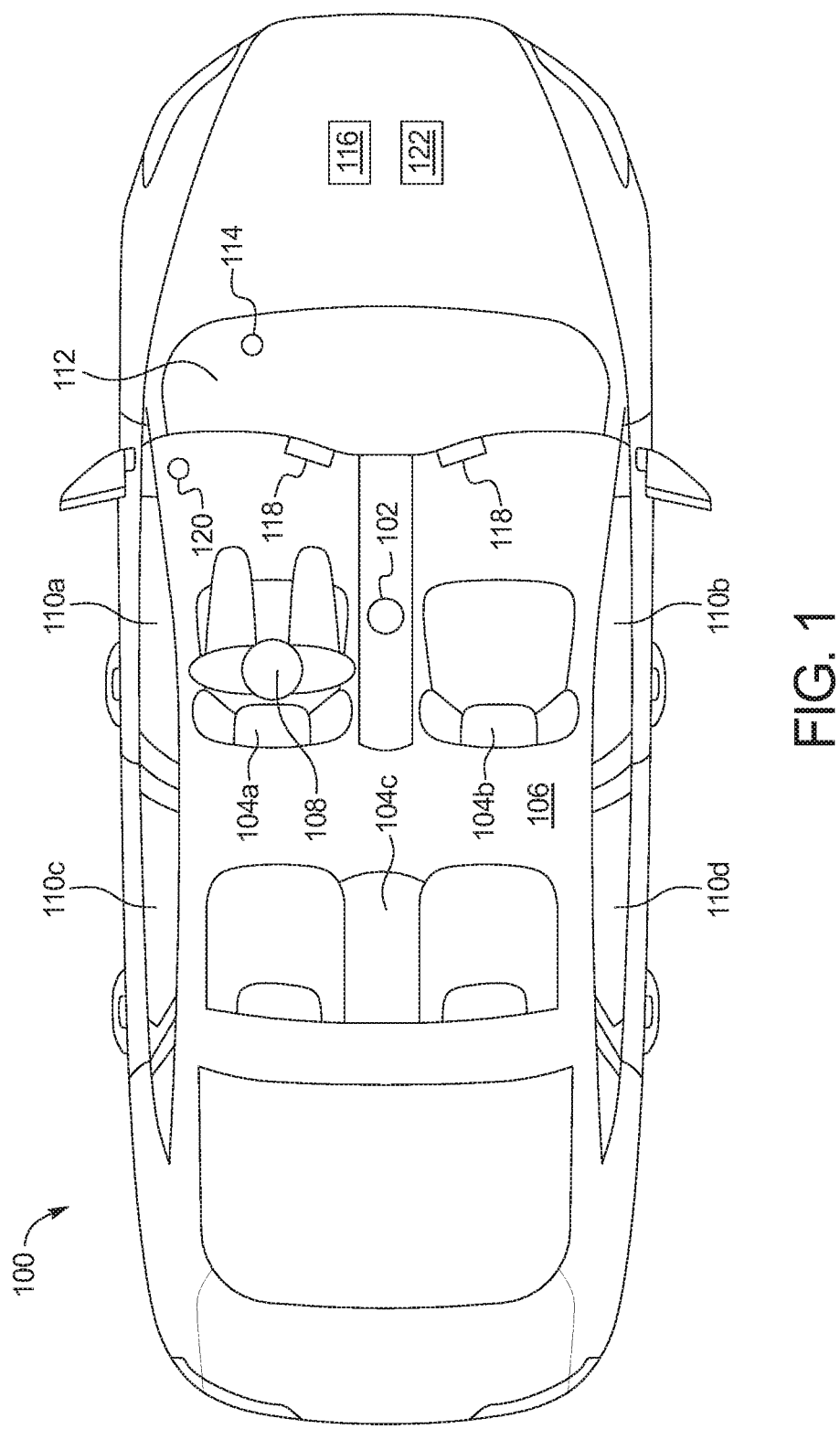
FIG. 1 illustrates an example vehicle including an infrared sensor array in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Generally, a vehicle includes a windshield, a rear window, and side windows that partially define a cabin of the vehicle and enable a driver and/or other occupant(s) (e.g., passengers) to view an area surrounding the vehicle. Oftentimes, the windshield is formed from laminated safety glass, and the side and rear windows are formed from tempered glass, laminated glass, polycarbonate, acrylic resins, and/or other materials.

In some instances when a glass temperature is at or below a dew point temperature, a film of fog and/or ice forms on the windshield, the side windows, and/or the rear window as a result of condensation collecting on an interior surface of the windows. For example, condensation collects on the windows when the glass temperature is at or below a dew point temperature of air adjacent to the glass. Some vehicles include vents of an HVAC system that are located on a top surface of a dashboard adjacent to the windshield to facilitate defogging of the windshield. Further, some vehicles include sensors that monitor when a film of fog is present on the windshield (e.g., by monitoring an ambient temperature, a cabin temperature, and/or a cabin humidity adjacent to the windshield). In such instances, the HVAC system may blow warm and/or dry air onto the windshield via the vents that are located adjacent to the windshield to defog the windshield by increasing the temperature of the windshield.

Further, in some instances, fog may form on a side window when the vehicle is located in a cold environment and an occupant is sitting next to the side window. For example, the condensation collected on the side window may originate, at least in part, from moisture expelled by the occupant breathing, wet clothing, water and/or snow brought into the vehicle, etc. In such instances, it potentially may be difficult to monitor a temperature and/or a humidity of area around to the side window to detect whether fog has formed on the side windshield. Further, it potentially may be difficult to control an environment (e.g., a temperature) within the cabin of the vehicle that both defogs the side window and is comfortable for the occupant positioned next to the side window.

Example methods, apparatus, and computer readable media disclosed herein utilize an infrared sensor array located within a cabin of a vehicle to detect both whether fog has formed on a side window and whether a body temperature (e.g., a face temperature) of an occupant is outside a comfortable temperature range. A cabin environment controller of the examples disclosed herein monitors the body temperature of the occupant via a first set of pixels of resolution of the infrared sensor array and monitors the side window based on a second set of pixels of resolution of the infrared sensor array. The cabin environment controller controls HVAC settings to defog and/or to deter fog from forming on the side window and to maintain the body temperature of the occupant to be within the comfortable temperature range.

Example vehicles disclosed herein include a cabin, a windshield, one or more side windows, and an infrared sensor array. As used herein, an "infrared sensor array" refers to a device that includes a plurality of infrared sensors for obtaining measurements of characteristics (e.g., temperature, light refraction, etc.). The infrared sensor array determines a map or grid (e.g., a two-dimensional grid) of pixels of measurement resolution for one or more characteristics (e.g., temperature, light refraction, etc.). As used herein, a "pixel of resolution" and a "pixel of measurement resolution" refer to a discrete area (e.g., a square) or element of a map or grid that is assigned a characteristic value. For example, an infrared sensor array may determine an 8×8 grid (i.e., 8 columns and 8 rows) of 64 pixels of measurement resolution in which each pixel is assigned a corresponding value for one or more characteristics (e.g., temperature, light refraction, etc.).

The infrared sensor array of the example vehicles disclosed herein includes first pixels of measurement resolution for monitoring a vehicle occupant and second pixels of measurement resolution for monitoring one or more of the side windows. Further, the example vehicles disclosed herein include a cabin environment controller that detects, via the first pixels, whether a body temperature (e.g., a face temperature) of the occupant is outside a predetermined temperature range and detects, via the second pixels, whether fog is on the side window. For example, the predetermined temperature range corresponds to a temperature range that is comfortable for the occupant(s) of the vehicle. In some examples, the vehicle includes a windshield sensor adjacent to the windshield that monitors an ambient temperature, a cabin temperature, and/or a cabin humidity to detect whether fog is on the windshield.

In some examples, the cabin environment controller selects the first pixels of measurement resolution and the second pixels of measurement resolution of the infrared sensor array based on a location of the occupant relative to an adjacent one of the side windows. Some example vehicles includes a camera that enables the cabin environment controller to determine the location of the occupant within the cabin of the vehicle. Additionally or alternatively, the cabin environment controller detects the location of the occupant based on a temperature map that is determined via the infrared sensor array. For example, the first pixels selected by the cabin environment controller have a temperature value that is greater than or equal to a body temperature threshold, and the second pixels selected by the cabin environment controller have a temperature value that is less than the body temperature threshold. The body temperature threshold is associated with a minimum temperature that corresponds to a temperature of a body (e.g., approximately 90° Fahrenheit, 32° Celsius).

Some example vehicles disclosed herein include an HVAC system that includes one or more vents, a heater, an air conditioner, and/or any other component that enables control of the environment and/or temperature of the cabin of the vehicle. The HVAC system is in communication with the cabin environment controller to enable the cabin environment controller to adjust an HVAC setting of the HVAC system. For example, the cabin environment controller adjusts the HVAC setting to decrease a cabin temperature to affect the body temperature of the occupant upon detecting, via the first pixels, that the body temperature of the occupant is greater than an upper limit of the predetermined temperature range. The cabin environment controller adjusts the HVAC setting to increase the cabin temperature to affect the body temperature of the occupant upon detecting, via the first pixels, that the body temperature of the occupant is less than a lower limit of the predetermined temperature range. Additionally or alternatively, the cabin environment controller adjusts the HVAC setting to defog the side window upon detecting, via the second pixels, that a film of fog has formed on the side window. For example, the cabin environment controller adjusts the HVAC setting to a predetermined defog mode or a predetermined defrost-floor mode to defog the side window. As used herein, to "defog" refers to a process of removing a film of fog from a window. In some examples, a window is defogged by removing moisture from and/or increasing a temperature of air adjacent to the window.

FIG. 1 illustrates an example vehicle 100 including an infrared sensor array 102 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

As illustrated in FIG. 1, the vehicle 100 includes the infrared sensor array 102 and seats 104 located within a cabin 106 of the vehicle 100. The seats include a front seat 104a (e.g., a driver-side front seat), another front seat 104b (e.g., a passenger-side front seat), and a back seat 104c. The infrared sensor array 102 includes a plurality of infrared sensors that enable the infrared sensor array 102 to determine a map or grid (e.g., a two-dimensional grid) of pixels of measurement resolution for one or more characteristics (e.g., temperature, light refraction, etc.) measured by the plurality of infrared sensors. For example, the infrared sensor array 102 may produce an 8×8 grid (i.e., 8 columns and 8 rows) of 64 pixels of resolution or may produce a 16×4 grid (i.e., 16 columns and 4 rows) of 64 pixels of resolution. The infrared sensor array 102 is utilized to monitor a (e.g., a face temperature) temperature of an occupant 108 (e.g., a driver in the front seat 104a) and one or more side windows 110 of the vehicle. For example, the infrared sensor array 102 monitors a side window 110a adjacent to the front seat 104a, a side window 110b adjacent to the front seat 104b, a side window 110c adjacent to the back seat 104c on a driver-side of the vehicle 100, and/or a side window 110d adjacent to the back seat 104c on a passenger-side of the vehicle 100. In the illustrated example, the infrared sensor array 102 is positioned on a ceiling of the cabin 106 between the front seat 104a and the front seat 104b to enable the infrared sensor array 102 to have a line-of sight to and, thus, monitor the occupant 108 and each of the side windows 110. In other examples, the infrared sensor array 102 and/or another infrared sensor array 102 may be positioned at another located within the cabin 106 that enable monitoring of the occupant 108, one or more other occupants, and/or one or more of the side windows 110.

The vehicle 100 of the illustrated example also includes a windshield 112 and a windshield sensor 114 adjacent to the windshield 112. For example, the windshield sensor 114 may be positioned on an upper surface of a dashboard to be located next to the windshield 112 of the vehicle 100. The windshield sensor 114 of the illustrated example detects whether fog (e.g., a layer) has formed on the windshield 112. For example, the windshield sensor 114 monitors an ambient temperature, a cabin temperature, and/or a cabin humidity to detect whether fog is on the windshield 112.

Further, the vehicle 100 includes an HVAC system 116 to adjust, maintain, and/or otherwise affect an environment within the cabin 106 of the vehicle 100. For example, the HVAC system 116 enables a temperature and/or a moisture level within the cabin 106 to be controlled. The HVAC system 116 of the illustrated example includes vents 118, a heater (e.g., a heater 514 of FIG. 5), and an air conditioner (e.g., an air conditioner 516 of FIG. 5). For example, the heater warms air and expels the warmed air through one or more of the vents 118 to increase an air temperature within the cabin 106, and the air conditioner cools air and expels the cooled air through one or more of the vents 118 to decrease the air temperature within the cabin 106. In the illustrated example, one of the vents 118 is directed toward the front seat 104a and another of the vents is directed toward the front seat 104b. In other examples, the HVAC system 116 of the vehicle 100 may include more or less of the vents 118. Additionally or alternatively, the vents 118 of the HVAC system 116 may located at different positions (e.g., near a floor, near the back seat 104c, adjacent to the side windows 110, adjacent to the windshield 112, etc.).

The vehicle 100 of the illustrated example also includes a camera 120. For example, the camera 120 is positioned within the cabin 106 and near the front seat 104a of the vehicle 100 to detect a position of the occupant 108 when the occupant 108 is seated in the front seat 104a. The camera 120 monitors the occupant 108 to detect whether the occupant 108 is leaning (e.g., forward, backward, etc.), has adjusted a backrest of the front seat 104a, has adjusted a position of the front seat 104a, etc. In other examples, the camera 120 and/or another camera may be located near the front seat 104b and/or the back seat 104c to monitor an occupant seated in that location.

The camera 120 of the illustrated example may be utilized to determine the location of the occupant 108 within the cabin 106 of the vehicle 100. Further, the HVAC system 116 includes a heater 514, an air conditioner 516, and the vents 118. For example, the heater 514 heats air and expels the heated air through the vents 118 and into the cabin 106 to increase the temperature within the cabin 106 of the vehicle 100, and the air conditioner 516 cools air and expels the cooled air through the vents 118 and into the cabin 106 to decrease the temperature within the cabin 106 of the vehicle 100.

As illustrated in FIG. 1, the vehicle 100 also includes a cabin environment controller 122 that is communicatively coupled to the HVAC system 116. The cabin environment controller 122 monitors environmental characteristics (e.g., temperatures, moisture levels, etc.) of the cabin 106 and/or the occupant 108 within the cabin 106 of the vehicle 100 and controls the environment within the cabin 106, for example, by adjusting HVAC settings of the HVAC system 116 based environmental characteristic measurements.

For example, the cabin environment controller 122 monitors one or more of the side windows 110, monitors a body temperature of the occupant 108, and/or adjusts an HVAC setting of the HVAC system 116 based on a status of the one or more of the side windows 110 and/or the body temperature. For example, the cabin environment controller 122 adjusts the HVAC setting of the HVAC system 116 in response to detecting, via the infrared sensor array 102, that the body temperature of the occupant 108 is outside of a predetermined temperature range (e.g., a temperature range that is determined to be comfortable for occupants within a vehicle) and/or that a film of fog has formed on one or more of the side windows 110. Additionally or alternatively, the cabin environment controller 122 adjusts the HVAC setting of the HVAC system 116 in response to detecting, via the windshield sensor 114, that a film of fog has formed on the windshield 112. The cabin environment controller 122 adjusts the HVAC setting, for example, by adjusting a rate of airflow through one or more of the vents 118 of the vehicle 100 and/or by adjusting a temperature (e.g., via an air conditioner and/or a heater) of the air flowing through one or more of the vents 118 and into the cabin 106 of the vehicle 100.

Figure 2:
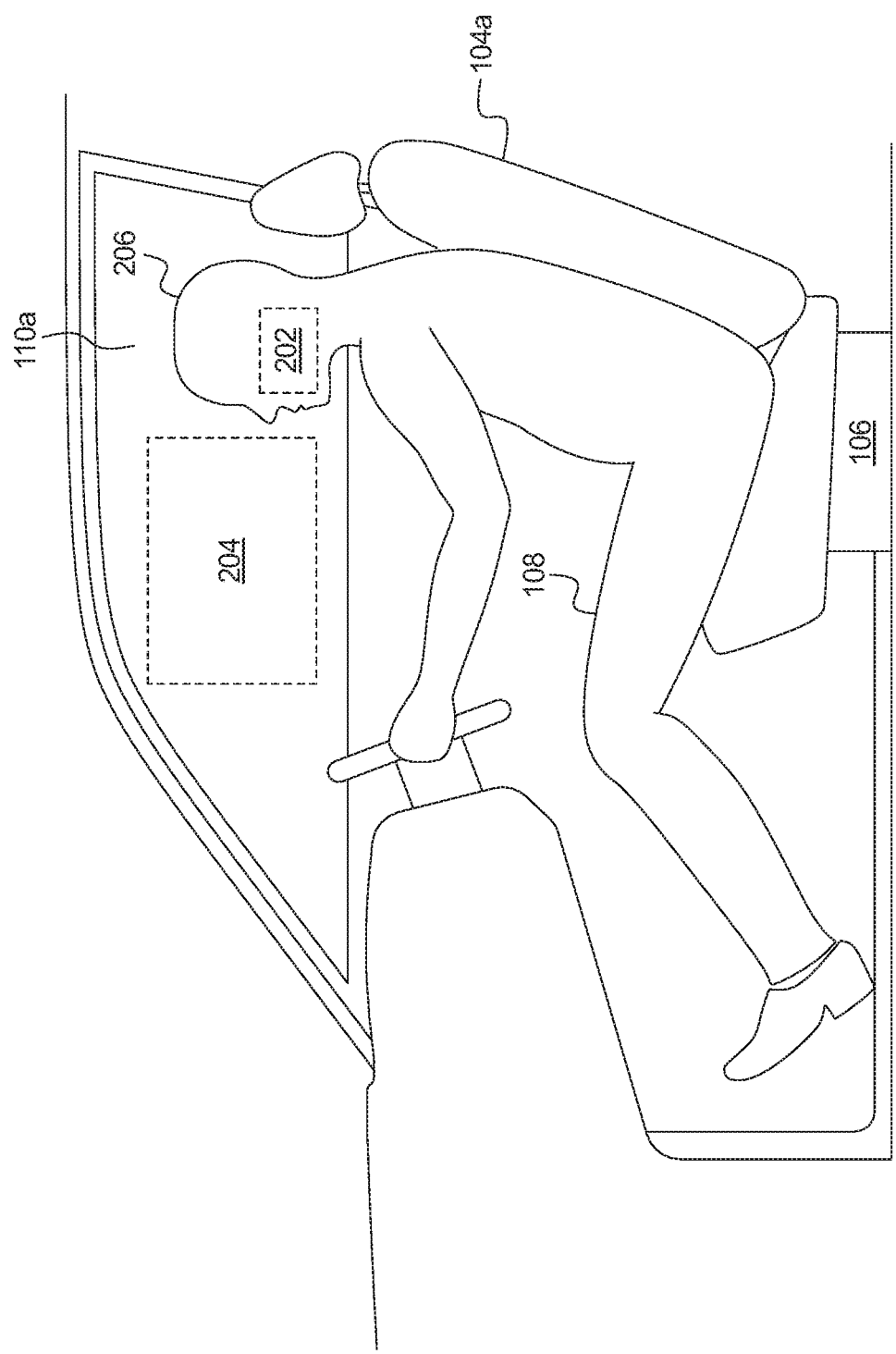
FIG. 2 illustrates first pixels of measurement resolution and second pixels of measurement resolution of the infrared sensor array of FIG. 1.

FIG. 2 depicts an image of the occupant 108 and the side window 110a of the vehicle 100 that is monitored by the cabin environment controller 122 via the infrared sensor array 102. The infrared sensor array 102 determines a map or grid (e.g., a two-dimensional grid) of pixels of measurement resolution for one or more characteristics (e.g., temperature, light refraction, etc.) measured by the plurality of infrared sensors measured by the plurality of sensors of the infrared sensor array 102. For example, the infrared sensor array 102 includes a processor and memory that enables the infrared sensor array 102 to collect and store measurements from each of the plurality of sensors, analyze the collected measurements, and determine the map of pixels of measurement resolution based on the analysis of the collected measurements. In other examples, another processor and memory (e.g., a processor 510 and memory 512 of FIG. 5) may be utilized to determine the map of pixels of measurement resolution based on the measurements collected by the plurality of sensors of the infrared sensor array 102. Further, in some examples, the infrared sensor array 102 includes optics that enable the infrared sensor array 102 to collect light within a specified field-of-view.

In the illustrated example, the pixels of measurement resolution includes one or more first pixels 202 of measurement resolution and one or more second pixels 204 of measurement resolution. The cabin environment controller 122 analyzes the pixels of measurement resolution to determine a location of the occupant 108 within the cabin 106 of the vehicle 100, whether the body temperature of the occupant is outside of a predetermined temperature range, and/or whether fog has formed on the side window 110a of the vehicle 100.

For example, to determine the location of the occupant 108, the infrared sensor array 102 collects temperature measurements collected by each of the plurality of sensors. For example, the plurality of sensors may measure a temperature of a head 206 and/or other exposed skin of the occupant 108 that is located within the map of pixels of measurement resolution. Subsequently, the infrared sensor array 102 determines the temperature map based on those collected temperature measurements. For example, to form the temperature map, the infrared sensor array 102 assigns and/or associates each of the pixels of measurements resolution of the temperature map with a corresponding temperature value that is determined based on the temperature measurements. Further, the cabin environment controller 122 compares the temperature of each of the pixels of measurements resolution to a body temperature threshold that corresponds to a lower limit of a typical body temperature of a person. The cabin environment controller 122 detects the location of the occupant 108 (e.g., the location of the head 206 and/or other exposed portions of skin of the occupant 108) by identifying one or more contiguous pixels of measurement resolution that have a temperature value that is greater than or equal to the body temperature threshold (e.g., approximately 90° Fahrenheit, 32° Celsius). Upon detecting the location of the head 206 and/or other portions of the occupant 108, the cabin environment controller 122 selects those pixels of measurement resolution that correspond to the location of the occupant 108 (e.g., those pixels that have a temperature value greater than or equal to the body temperature threshold) as the first pixels 202.

The cabin environment controller 122 also detects whether the body temperature of the occupant 108 is outside of a predetermined temperature range of comfort by comparing the temperature value of the first pixels 202 to the predetermined temperature range. For example, a lower limit of the predetermined temperature range is greater than the body temperature threshold that is utilized to determine the presence of the occupant 108. When the detected body temperature of the occupant 108 is less than the lower limit of the predetermined temperature range, the cabin environment controller 122 adjusts the HVAC setting (e.g., increases a temperature of air flowing through the vents 118, increases a flow rate at which heated air flows through the vents, turns down and/or off the air conditioner, etc.) to increase a cabin temperature to affect the body temperature of the occupant 108. When the detected body temperature of the occupant 108 is greater than an upper limit of the predetermined temperature range, the cabin environment controller 122 adjusts the HVAC setting (e.g., decreases a temperature of air flowing through the vents 118, increases a flow rate at which cooled air flows through the vents, turns down and/or off the heater, etc.) to decrease the cabin temperature to affect the body temperature of the occupant 108.

Further, the cabin environment controller 122 selects the second pixels 204 for monitoring the side window 110a based on the location of the occupant 108 relative to the side window 110a. That is, the cabin environment controller 122 selects as the second pixels 204 those pixels of measurement resolution that both are not included in the first pixels 202 and correspond to a fixed location of the side window 110a. For example, the cabin environment controller 122 utilizes an algorithm to select the first pixels 202 and the second pixels 204 based on the temperature map determined by the infrared sensor array 102.

Upon selecting the second pixels 204 that correspond to the location of the side window 110a, the infrared sensor array 102 determines another map or grid for infrared absorption by water based on infrared absorption measurements collected by the plurality of sensors of the infrared sensor array 102. The cabin environment controller 122 determines a infrared absorption value corresponding to the second pixels 204 (e.g., by averaging an infrared absorption value for each of the second pixels 204). Further, the cabin environment controller 122 compares the infrared absorption value of the second pixels 204 to a water absorption threshold that corresponds to the presence of fog. Because water absorbs infrared radiation, the cabin environment controller 122 determines that fog has formed on an inner surface of the side window 110a when the infrared absorption value of the second pixels 204 is greater than the water absorption threshold. Upon detecting that fog is on the side window 110a, the cabin environment controller 122 adjusts the HVAC setting to defog (e.g., remove fog from) the side window 110a. For example, the cabin environment controller 122 defogs the side window 110a by adjusting the HVAC setting to a defog mode or a defrost-floor mode.

Figure 3:
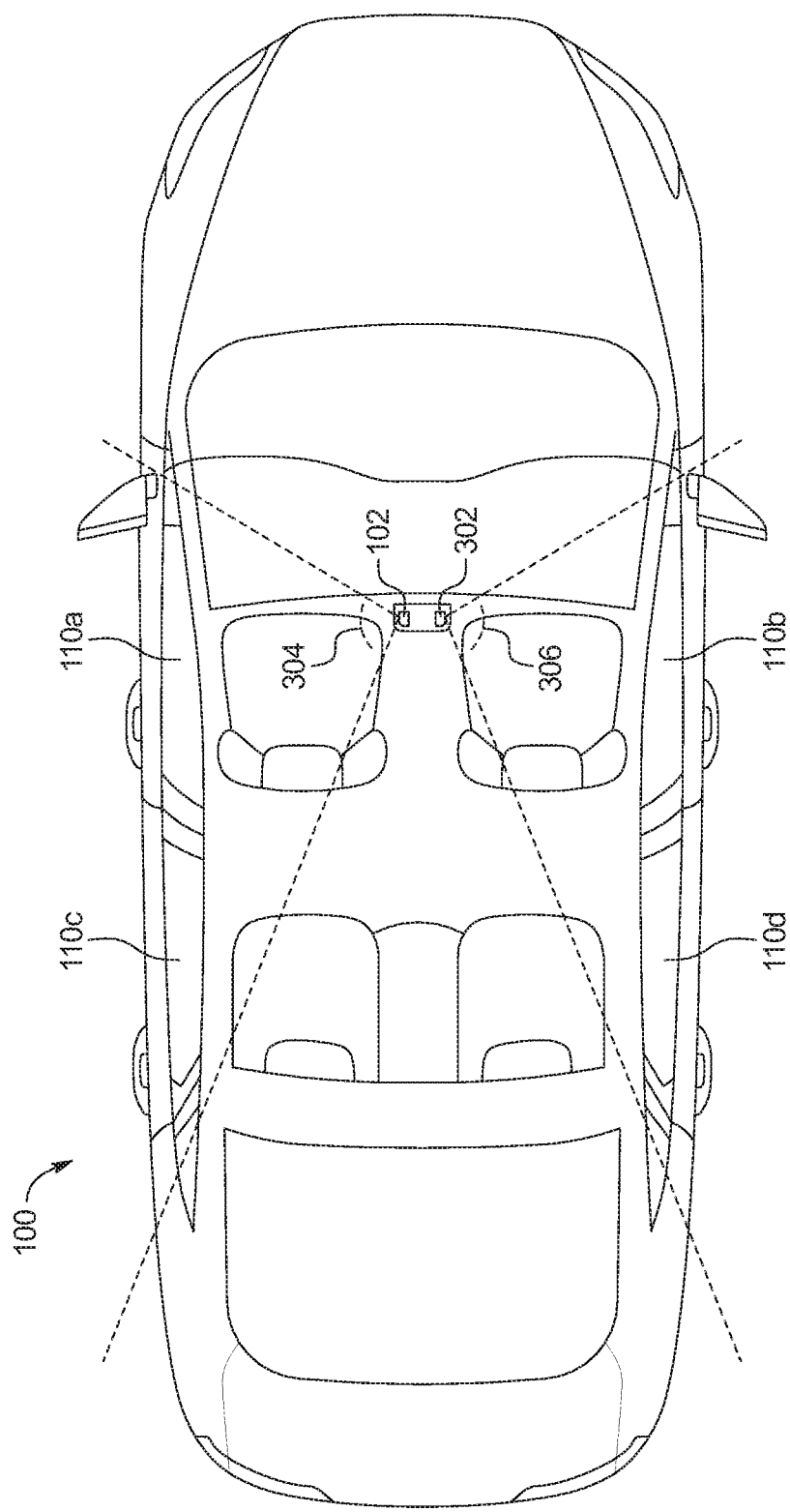
FIG. 3 illustrates a field-of-view of the infrared sensor array of FIG. 1 and another infrared sensor array in a first plane.

FIG. 3 illustrates the infrared sensor array 102 and another infrared sensor array 302 within the vehicle 100 from a top view of the vehicle 100. The infrared sensor array 102 includes a field-of-view 304 and the infrared sensor array 302 includes a field-of-view 306 in a plane that is parallel to a surface of the ground. In the illustrated example, the field-of-view 304 enables the infrared sensor array 102 to monitor the side window 110a and the side window 110c on the driver-side of the vehicle 100, and the field-of-view 306 enables the infrared sensor array 302 to monitor the side window 110b and the side window 110d on the passenger-side of the vehicle 100. In some examples, each of the field-of-view 304 and the field-of-view 306 are approximately 120 degrees to facilitate monitoring of each of the side windows 110.

Figure 4:
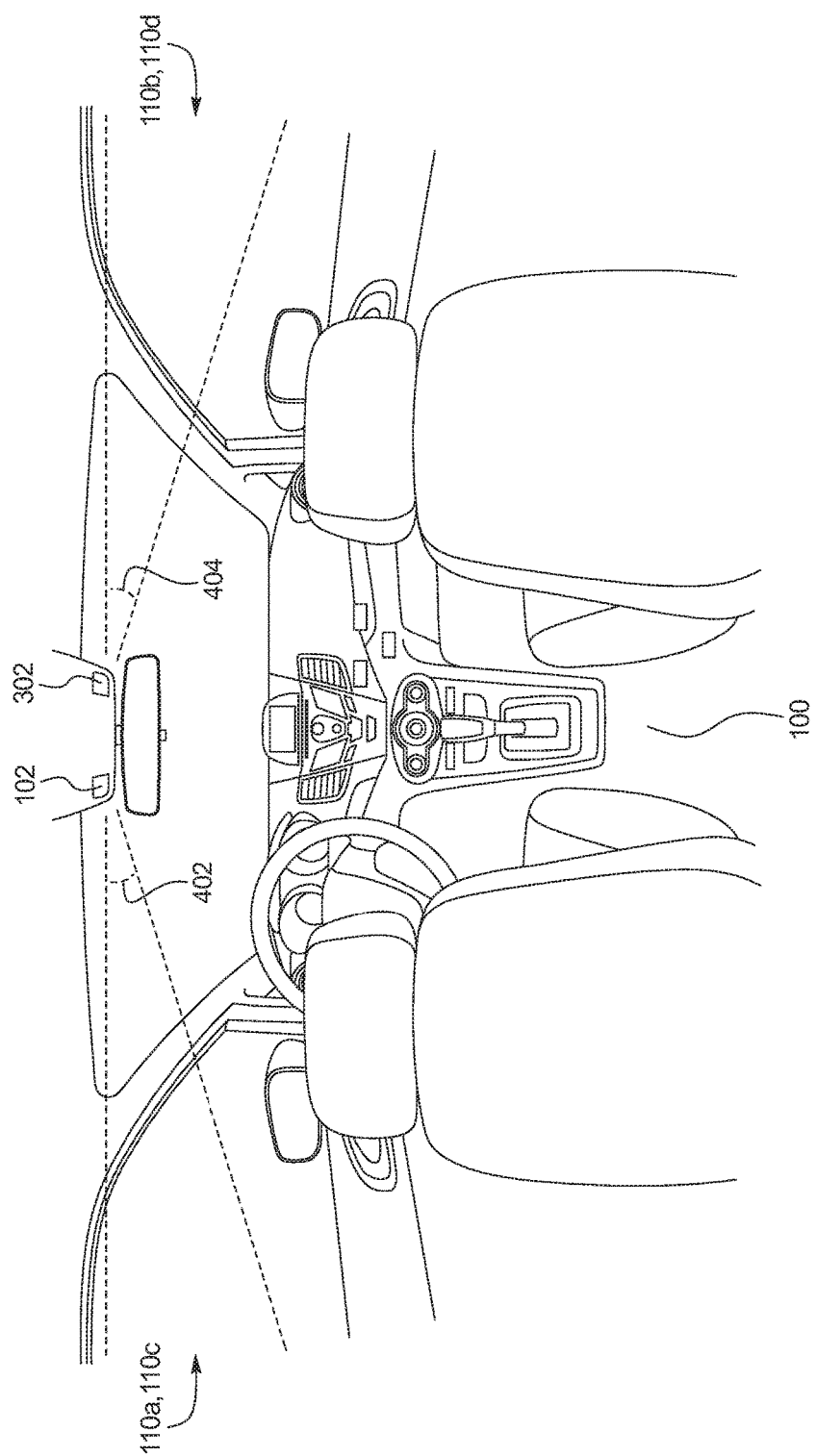
FIG. 4 illustrates the field-of-view of FIG. 3 in a second plane.

FIG. 4 illustrates the infrared sensor array 102 and the infrared sensor array 302 from a back view of the vehicle 100. The infrared sensor array 102 includes a field-of-view 402 and the infrared sensor array 302 includes a field-of-view 404 in a plane that is perpendicular to a surface of the ground and parallel to a width of the vehicle 100. In the illustrated example, the field-of-view 402 enables the infrared sensor array 102 to monitor along a height of the side window 110a and the side window 110c on the driver-side of the vehicle 100, and the field-of-view 404 enables the infrared sensor array 302 to monitor along a height of the side window 110b and the side window 110d on the passenger-side of the vehicle 100. In some examples, each of the field-of-view 304 and the field-of-view 306 are approximately between 60 degrees and 90 degrees to facilitate monitoring of each of the side windows 110.

Figure 5:
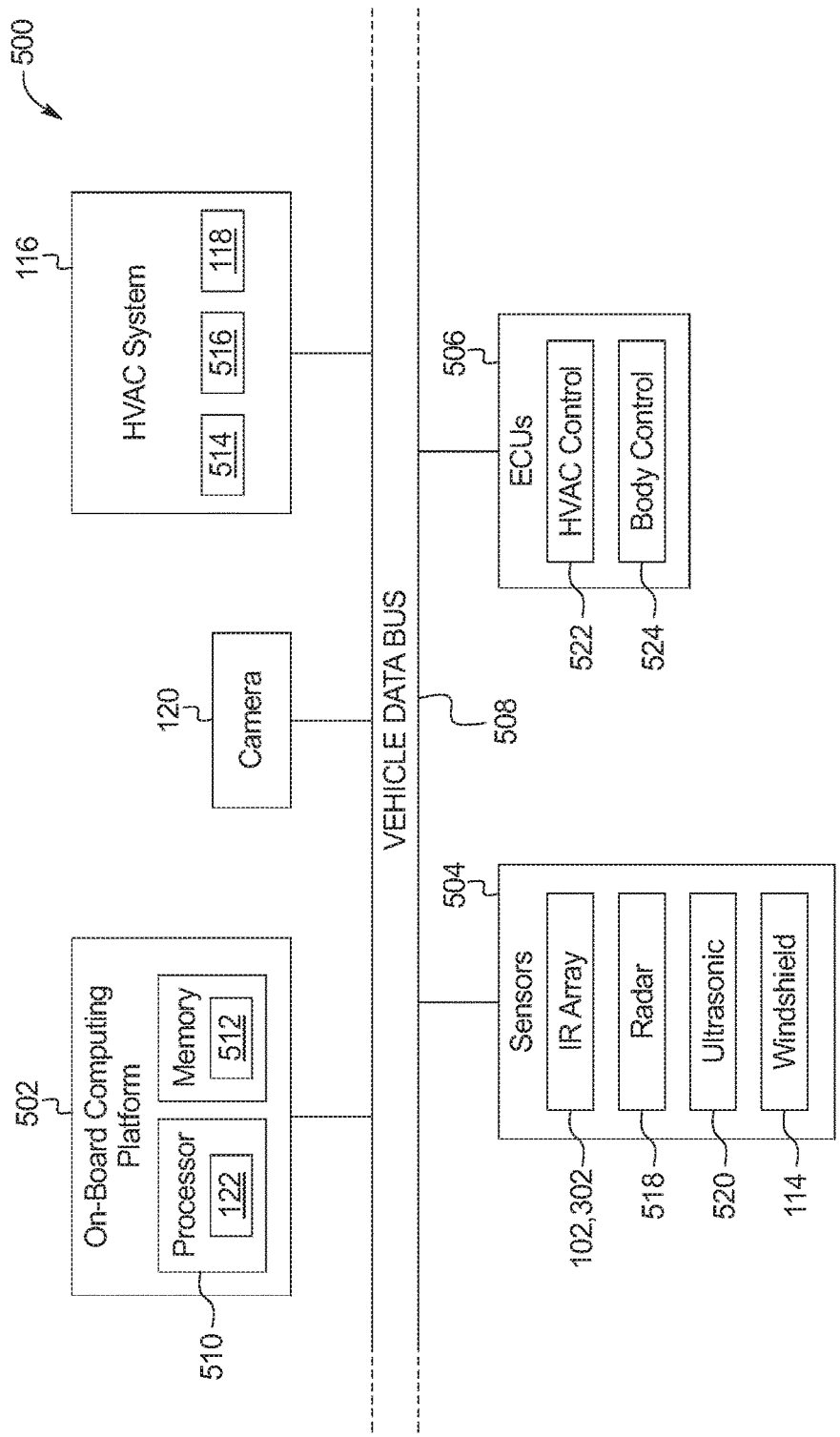
FIG. 5 is a block diagram of electronic components of the vehicle of FIG. 1.

FIG. 5 is a block diagram of electronic components 500 of the vehicle of FIG. 1. As illustrated in FIG. 5, the electronic components 500 include an on-board computing platform 502, the camera 120, the HVAC system 116, sensors 504, electronic control units (ECUs) 506, and a vehicle data bus 508.

The on-board computing platform 502 includes a microcontroller unit, controller or processor 510 and memory 512. In some examples, the processor 510 of the on-board computing platform 502 is structured to include the cabin environment controller 122. Alternatively, in some examples, the cabin environment controller 122 is incorporated into another electronic control unit (ECU) (e.g., an HVAC control unit) with its own processor 510 and memory 512. The processor 510 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 512 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 512 includes multiple kinds of memory, particularly volatile memory and non-volatile memory.

The memory 512 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 512, the computer readable medium, and/or within the processor 510 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The camera 120 of the illustrated example may be utilized to determine the location of the occupant 108 within the cabin 106 of the vehicle 100. Further, the HVAC system 116 includes a heater 514, an air conditioner 516, and the vents 118. For example, the heater 514 heats air and expels the heated air through the vents 118 and into the cabin 106 to increase the temperature within the cabin 106 of the vehicle 100, and the air conditioner 516 cools air and expels the cooled air through the vents 118 and into the cabin 106 to decrease the temperature within the cabin 106 of the vehicle 100.

The sensors 504 are arranged in and around the vehicle 100 to monitor properties of the vehicle 100 and/or an environment in which the vehicle 100 is located. One or more of the sensors 504 may be mounted to measure properties around an exterior of the vehicle 100. Additionally or alternatively, one or more of the sensors 504 may be mounted inside a cabin of the vehicle 100 or in a body of the vehicle 100 (e.g., an engine compartment, wheel wells, etc.) to measure properties in an interior of the vehicle 100. For example, the sensors 504 include accelerometers, odometers, tachometers, pitch and yaw sensors, wheel speed sensors, microphones, tire pressure sensors, biometric sensors and/or sensors of any other suitable type. In the illustrated example, the sensors 504 include the infrared sensor array 102 and/or the infrared sensor array 302, a radar sensor 518, an ultrasonic sensor 520, and the windshield sensor 114. For example, the infrared sensor arrays 102, 302 are utilized to monitor the side windows 110, to determine locations of respective occupants (e.g., the occupant 108) within the vehicle 100, and/or to determine body temperatures of those occupants within the vehicle 100. In some examples, the radar sensor 518 utilizes radio waves and/or the ultrasonic sensor 520 utilizes ultrasonic waves to determine the location of the occupant 108 within the cabin 106 of the vehicle 100. Further, the windshield sensor 114 measures an ambient temperature, a cabin temperature, and a cabin humidity adjacent to the windshield 112 to detect whether fog is present on the windshield 112.

The ECUs 506 monitor and control the subsystems of the vehicle 100. For example, the ECUs 506 are discrete sets of electronics that include their own circuit(s) (e.g., integrated circuits, microprocessors, memory, storage, etc.) and firmware, sensors, actuators, and/or mounting hardware. The ECUs 506 communicate and exchange information via a vehicle data bus (e.g., the vehicle data bus 508). Additionally, the ECUs 506 may communicate properties (e.g., status of the ECUs 506, sensor readings, control state, error and diagnostic codes, etc.) to and/or receive requests from each other. For example, the vehicle 100 may have seventy or more of the ECUs 506 that are positioned in various locations around the vehicle 100 and are communicatively coupled by the vehicle data bus 508. In the illustrated example, the ECUs 506 include an HVAC control unit 522 and a body control module 524. For example, the HVAC control unit 522 operates and controls the vents 118, the heater 514, the air conditioner 516, and/or other components of the HVAC system 116 to control the environment within the cabin 106 of the vehicle 100. The body control module 524 controls one or more subsystems throughout the vehicle 100, such as power windows, power locks, an immobilizer system, power mirrors, etc. For example, the body control module 524 includes circuits that drive one or more of relays (e.g., to control wiper fluid, etc.), brushed direct current (DC) motors (e.g., to control power seats, power locks, power windows, wipers, etc.), stepper motors, LEDs, etc.

The vehicle data bus 508 communicatively couples the HVAC system 116, the camera 120, the on-board computing platform 502, the sensors 504, and the ECUs 506. In some examples, the vehicle data bus 508 includes one or more data buses. The vehicle data bus 508 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 6:
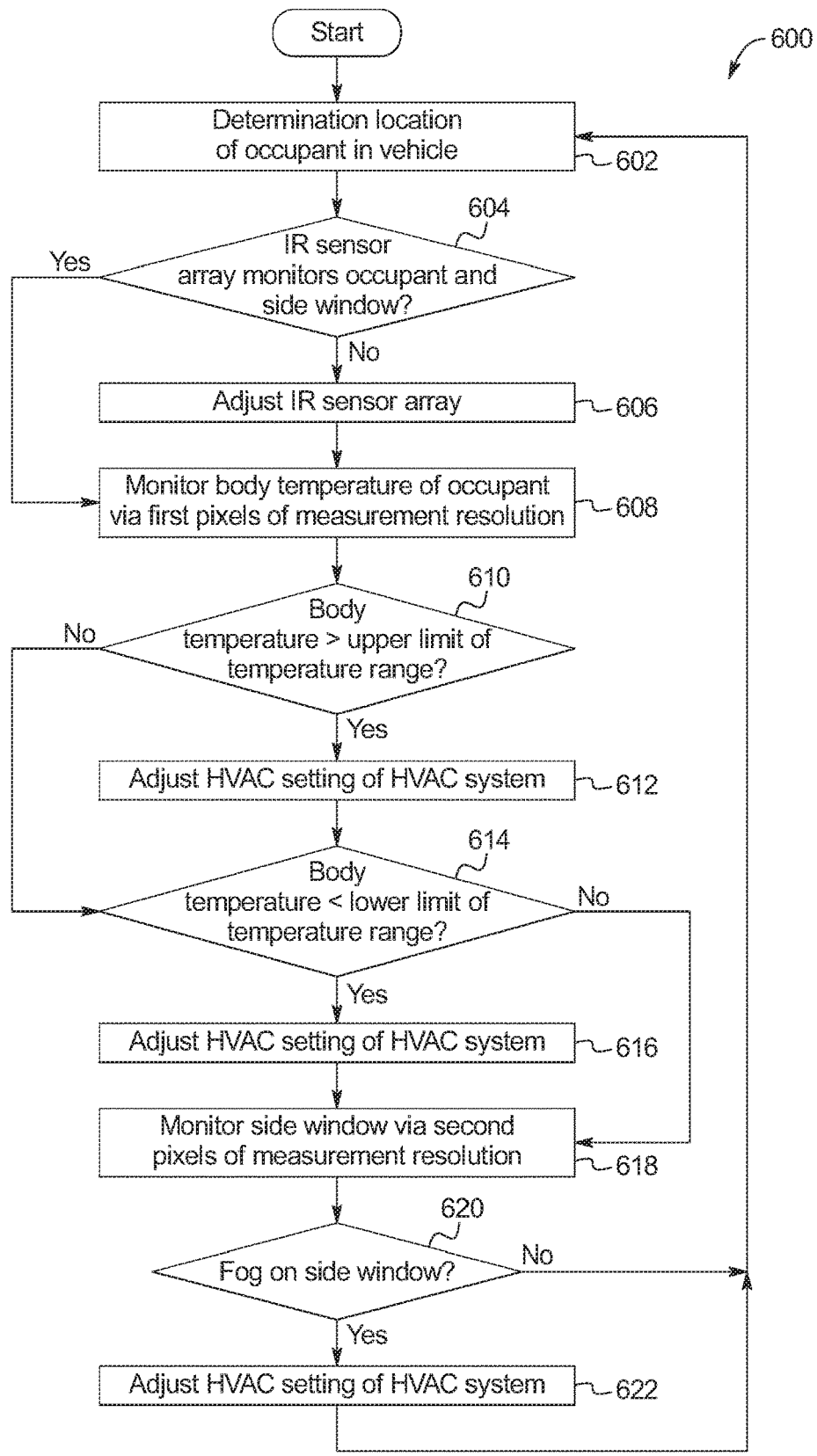
FIG. 6 is a flowchart of an example method for monitoring a vehicle occupant and a side window via the infrared sensor array of FIG. 1.

FIG. 6 is a flowchart of an example method 600 to monitor an occupant and a side window of a vehicle via an infrared sensor array. The flowchart of FIG. 6 is representative of machine readable instructions that are stored in memory (such as the memory 512 of FIG. 5) and include one or more programs which, when executed by a processor (such as the processor 510 of FIG. 5), cause the vehicle 100 to implement the example cabin environment controller 122 of FIGS. 1 and 5. While the example program is described with reference to the flowchart illustrated in FIG. 6, many other methods of implementing the example cabin environment controller 122 may alternatively be used. For example, the order of execution of the blocks may be rearranged, changed, eliminated, and/or combined to perform the method 600. Further, because the method 600 is disclosed in connection with the components of FIGS. 1-5, some functions of those components will not be described in detail below.

Initially, at block 602 the cabin environment controller 122 determines the location of the occupant 108 within the cabin 106 of the vehicle 100. For example, the cabin environment controller 122 determines the location of the occupant 108 via the infrared sensor array 102 (and/or the infrared sensor array 302), the camera 120, the radar sensor 518, and/or the ultrasonic sensor 520. At block 604, the cabin environment controller 122 determines whether the infrared sensor array 102 is monitoring the occupant 108 and one or more of the side windows 110 (e.g., the side window 110a and/or the side window 110c). In response to determining that the infrared sensor array 102 is not monitoring the occupant 108 and one or more of the side windows 110, the cabin environment controller 122 adjusts the infrared sensor array 102 so that the first pixels 202 of measurement resolution of the infrared sensor array 102 monitor the occupant 108 and the second pixels 204 of measurement resolution of the infrared sensor array 102 monitor one or more of the side windows 110 (block 606). For example, the cabin environment controller 122 adjusts the infrared sensor array 102 by adjusting which of the pixels of measurement resolution of the infrared sensor array 102 are selected as the first pixels 202 and the second pixels 204 based on the location of the occupant 108 and the one or more of the side windows 110.

Upon adjusting the infrared sensor array 102 at block 606 or upon determining at block 408 that the infrared sensor array 102 is monitoring the occupant 108 and one or more of the side windows 110, the method 600 proceeds to block 608 at which the infrared sensor array 102 monitors the body temperature of the occupant 108 via the first pixels 202 of measurement resolution. At block 610, the cabin environment controller 122 determines whether the body temperature of the occupant 108 is greater than an upper limit of a predetermined temperature range of comfort. In response to detecting that the body temperature is greater than the upper limit, the cabin environment controller 122 adjusts an HVAC setting of the HVAC system 116 to decrease a cabin temperature to affect the body temperature of the occupant 108 (block 612). Upon detecting at block 610 that the body temperature is not greater than the upper limit or upon adjusting the HVAC setting at block 612, the method 600 proceeds to block 614 at which the cabin environment controller 122 determines whether the body temperature of the occupant 108 is less than a lower limit of a predetermined temperature range of comfort. In response to detecting that the body temperature is less than the lower limit, the cabin environment controller 122 adjusts the HVAC setting to increase the cabin temperature to affect the body temperature of the occupant 108 (block 616). Upon detecting at block 614 that the body temperature is not less than the lower limit or upon adjusting the HVAC setting at block 616, the method 600 proceeds to block 618.

At block 618, the infrared sensor array 102 monitors the one or more side windows 110 via the second pixels 204 of measurement resolution. at block 620, the cabin environment controller 122 determines, via the second pixels 204, whether fog is on one or more of the side windows 110. In response to detecting that fog has formed on the one or more of the side windows 110, the method 600 proceeds to block 622 at which the cabin environment controller 122 adjusts the HVAC setting to defog the one or more of the side windows 110. For example, the cabin environment controller 122 changes the HVAC setting to a defog mode or a defrost-floor mode. Upon adjusting the HVAC setting at block 622 or upon determining at block 620 that fog is not on one or more of the side windows 110, the method 600 returns to block 602. Further, in some examples, the cabin environment controller 122 monitors, via the windshield sensor 114, the windshield 112 for fog and adjusts the HVAC setting in response to detecting fog on the windshield 112.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    a side window;
    an infrared sensor array including first pixels of measurement resolution to monitor an occupant and second pixels of measurement resolution to monitor the side window; and
    a cabin environment controller to:
        select the first pixels and the second pixels of the infrared sensor array based on a location of the occupant relative to the side window;
        detect, via the first pixels, whether a body temperature of the occupant is outside a predetermined temperature range; and
        detect, via the second pixels, whether fog is on the side window.

2. The vehicle of claim 1, wherein the cabin environment controller detects the location of the occupant based on a temperature map determined via the infrared sensor array.

3. The vehicle of claim 2, wherein the first pixels selected by the cabin environment controller have a temperature value that is greater than or equal to a body temperature threshold.

4. The vehicle of claim 3, wherein the second pixels selected by the cabin environment controller have a temperature value that is less than the body temperature threshold.

5. The vehicle of claim 1, further including a camera to detect the location of the occupant.

6. The vehicle of claim 1, further including an HVAC system in communication with the cabin environment controller, wherein the cabin environment controller adjusts an HVAC setting of the HVAC system.

7. The vehicle of claim 6, wherein:
    the HVAC system includes a vent, a heater, and an air conditioner; and
    the cabin environment controller adjusts the HVAC setting by at least one of adjusting a rate of airflow through the vent and adjusting, via the air conditioner or the heater, a temperature of air flowing through the vent.

8. The vehicle of claim 1, wherein the cabin environment controller adjusts an HVAC setting to decrease a cabin temperature in response to detecting, via the first pixels, that the body temperature of the occupant is greater than an upper limit of the predetermined temperature range.

9. The vehicle of claim 8, wherein the cabin environment controller adjusts the HVAC setting to increase the cabin temperature in response to detecting, via the first pixels, that the body temperature of the occupant is less than a lower limit of the predetermined temperature range.

10. The vehicle of claim 1, wherein, the cabin environment controller adjusts an HVAC setting to defog the side window in response to detecting, via the second pixels, that fog is on the side window.

11. The vehicle of claim 10, wherein the cabin environment controller adjusts the HVAC setting to a defog mode or a defrost-floor mode to defog the side window.

12. The vehicle of claim 1, further including:
a windshield; and
a windshield sensor adjacent to the windshield to detect whether fog is on the windshield.

13. The vehicle of claim 12, wherein the windshield sensor monitors at least one of an ambient temperature, a cabin temperature, and a cabin humidity to detect whether fog is on the windshield.

14. A method comprising:
selecting first pixels and second pixels of resolution of an infrared sensor array based on an occupant location relative to a side window;
monitoring a body temperature of an occupant via the first pixels;
monitoring the side window via the second pixels; and
adjusting, via a processor, an HVAC setting responsive to detecting at least one of the body temperature being outside a predetermined temperature range and fog on the side window.

15. The method of claim 14, further including decreasing a cabin temperature by adjusting the HVAC setting in response to detecting, via the first pixels, that the body temperature of the occupant is greater than an upper limit of the predetermined temperature range.

16. The method of claim 15, further including increasing the cabin temperature by adjusting the HVAC setting in response to detecting, via the first pixels, that the body temperature of the occupant is less than a lower limit of the predetermined temperature range.

17. The method of claim 14, wherein adjusting the HVAC setting includes changing the HVAC setting to a defog mode or a defrost-floor mode to defog the side window in response to detecting, via the second pixels, fog on the side window.

18. The method of claim 14, further including monitoring, via a windshield sensor, at least one of an ambient temperature, a cabin temperature, and a cabin humidity to detect fog on a windshield.

* * * * *